Aug. 20, 1963  P. R. LOVELAND  3,101,174
WATER FOUNTAIN UNIT FOR ATTACHMENT TO A WATER FAUCET
Filed May 24, 1962
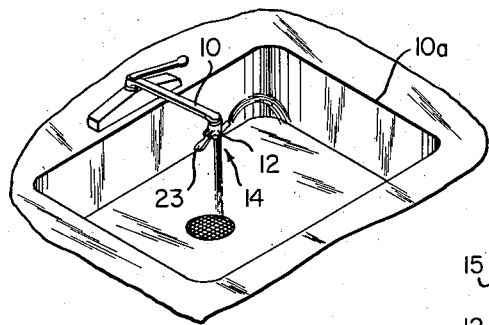
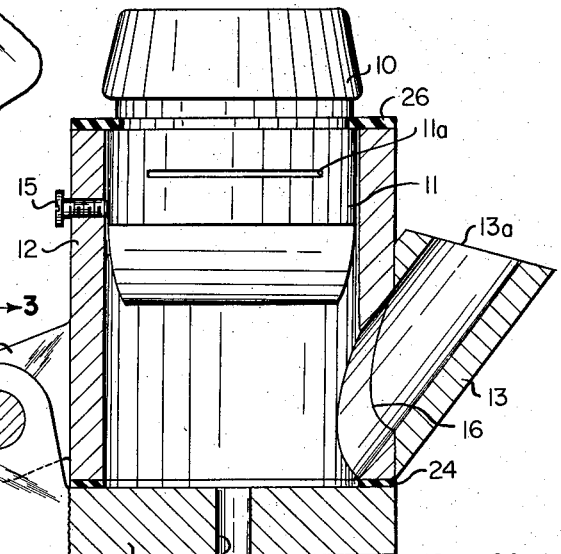
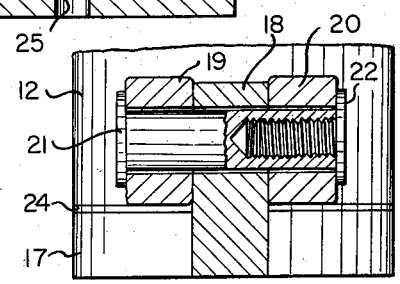
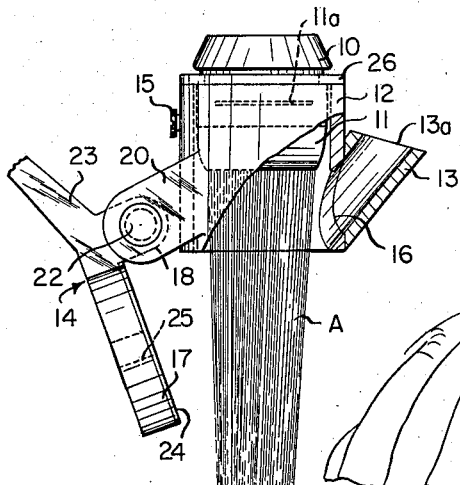
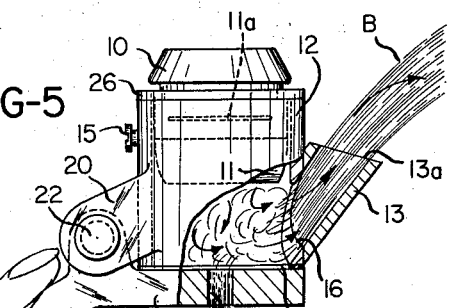
INVENTOR.
PRATT R. LOVELAND
BY MAHONEY MILLER & RAMBO
ATTORNEYS

United States Patent Office 3,101,174
Patented Aug. 20, 1963

3,101,174
WATER FOUNTAIN UNIT FOR ATTACHMENT TO A WATER FAUCET
Pratt R. Loveland, 2579 Woodley Road, Columbus 24, Ohio
Filed May 24, 1962, Ser. No. 197,436
2 Claims. (Cl. 239—27)

This invention relates to a water fountain unit for attachment to a water faucet capable of providing an upwardly directed stream of water suitable for drinking purposes.

Water faucets of the type commonly utilized in households are designed primarily for a downwardly directed stream of water. For drinking purposes, it is necessary that a container such as an ordinary water glass be provided to first receive a quantity of water. To prevent, or at least control, the spread of infectious disease, such as the common cold, each individual that may have occasion to obtain a drink of water must be provided with their own glass. Since a normal household includes several persons, a large number of glasses would ordinarily be utilized during a single day. This would necessarily entail a large amount of glass washing to assure continuance of the desired sanitary conditions. To avoid some of the glass washing, it is customary to provide each individual with a glass which may be intermittently utilized as desired and is washed once a day. The disadvantage of this procedure, however, is that the identity of each individual's glass is frequently lost, thus defeating the purpose. Disposable containers, paper cups, for example, may also be utilized; however, they are relatively expensive for everyday use. It would be preferable to provide a separate water fountain and thereby eliminate the necessity of providing glasses but the cost of most commercially available units is prohibitive and they usually entail considerable expense in their installation.

It is, therefore, the primary object of this invention to provide a water fountain unit that is readily attachable to a water faucet and will permit a normal flow of water therefrom or may be manually operated to direct a stream of water upwardly for drinking purposes.

It is also an object of this invention to provide a water fountain unit having an elongated tubular body which is readily attachable to a water faucet and including a spout for directing a stream of water upwardly and a valve member for restricting the normal flow of water through the body to cause a portion of the water to enter the spout.

It is another object of this invention to provide a water fountain unit which is readily attachable to the aerator component of a water faucet as well as many types of faucets not equipped with an aerator and will permit a normal flow of water therefrom or may be manually operated to direct a stream of water upwardly for drinking purposes.

It is a further object of this invention to provide a water fountain unit for a water faucet that may be economically fabricated having only one simply constructed movable member.

These and other objects and advantages of this invention will be readily apparent from the following detailed description of an embodiment thereof and the accompanying drawing.

In the drawing:

FIG. 1 is a perspective view of an embodiment of a water fountain unit attached to a water faucet and operating to provide an upwardly directed stream of water.

FIG. 2 is an enlarged vertical sectional view of the fountain unit.

FIG. 3 is a sectional detail taken along line 3—3 of FIG. 2.

FIG. 4 is a vertical elevation of the water fountain unit partly in section showing the normal flow of water therethrough when the valve is open.

FIG. 5 is a vertical elevation of the water fountain unit partly in section showing the flow of water therethrough when the valve is closed.

Having reference to the drawing, an embodiment of the water fountain unit is shown attached to a water faucet 10 mounted over a typical sink 10a and provided with a well-known type of aerator 11 having slots 11a disposed around the circumference thereof. The fountain unit, as best shown in FIG. 2, comprises in general an elongated tubular body 12 provided with a spout 13 and a valve member 14. The body 12 is of cylindrical form and is open at either end. One end of the body 12, which is of a suitable diameter, is positioned over the aerator 11 and the unit is secured thereto by a setscrew 15. The setscrew 15 is threaded into the body 12 to bear against the aerator 11 when turned inwardly to retain the fountain on the aerator. The internal diameter of the body 12 is greater than that of the aerator 11 to permit passage of air through the slots 11a from the interior of the body. It is to be understood that the fountain unit must be positioned on the aerator 11 in such a manner that the internal wall surfaces of the body will not unduly block the slots 11a. Preferably, the body 12 would be oriented relative to the slots 11a to position the portion of the body diametrically opposite the setscrew 15 substantially midway between any two of the slots.

Secured to the exterior of the body 12 is the spout 13. The spout 13 is an elongated cylindrical tube attached at one end to the body 12 adjacent the lower end thereof which is disposed a distance below the aerator 11. An opening 16 is formed in the wall of the body 12 for communicating with the spout. Thus, a stream of water may flow from the interior of the body 12 through the spout. The spout 13 is inclined upwardly and outwardly from the body 12 terminating in an orifice 13a disposed a distance above the lower end of the body. Water flowing through the spout will therefore continue upwardly as shown in FIG. 1 to provide a suitable stream of water for drinking. The height of the stream will be dependent on the pressure created by the fountain unit.

The illustrated embodiment of the fountain is preferably mounted on a vertically disposed aerator although the fountain may be satisfactorily utilized with faucet and aerator combinations of other configurations. In such application, it would only be necessary to modify the arrangement of the spout relative to the body to properly direct the stream of water. If desired, the body and spout may be integrally cast as a unit.

To provide the required pressure and divert at least a portion of the stream of water flowing out of the aerator through the spout 13, the valve member 14 is provided to restrict the normal flow of water from the lower end of the body 12. The valve member 14 includes a cylindrical disc or plate 17 having a diameter substantially equal to that of the body 12 for closing the end of the body. Secured to the periphery of the disc 17 is an upstanding lug 18 which is pivotally mounted between a pair of brackets 19 and 20. The brackets 19 and 20 are secured to the exterior of the body 12 adjacent the lower end thereof and support a pivot pin 21, see FIG. 3. The pivot pin 21 also extends through a cylindrical bore formed in the lug 18. A cap screw 22 is threaded into one end of the pin 21 to secure the pin to the brackets. Integrally formed with the disc 17 and the associated lug 18 is an elongated handle 23 to facilitate manual operation of the valve member. One surface of the disc 17 is provided with a sealing member 24 fabricated from a resilient material which forms a substantially water-impervious seal between the disc 17 and the lower end of the body 12 when the valve 14 is pivoted to its closed position as shown in FIG. 2. Preferably, the valve member 14 is mounted on the body 12 with the handle 23 disposed diametrically opposite the spout 13 to avoid interference with the stream of water flowing out of the spout.

Formed in the disc 17 is an aperture 25 of substantially smaller diameter. When the valve member 14 is pivoted to the closed position as shown in FIGS. 2 and 5, a portion of a stream of water flowing from the aerator 11 will flow through the aperture 25 and thereby reduce the pressure. A reduction of the pressure is desirable as the normal pressure of a household water system would produce a stream of water from the spout such as to preclude the utilization of the fountain. The reduction of pressure is also advantageous in that the effort required to hold the valve 14 in a closed position is substantially reduced, thereby avoiding leaks between the disc 17 and the lower end of the body which would produce an undesirable lateral spraying.

Since a pressure is built up within the body 12 when the lower end is closed by the valve 14, it is also necessary to provide a sealing member between the upper end of the body and the aerator 11. In the present embodiment, the sealing member consists of an annular ring 26 fabricated from a resilient material and is secured to the upper end of the body. The ring 26 extends a distance radially inward of the wall of the body 12 to contact the surface of the aerator. The resiliency of the ring 26 is sufficient to form a satisfactory seal since the pressure within the body 12 will be reduced by the aperture 25.

Although the present embodiment of the fountain is specifically adapted for attachment to a faucet provided with an aerator, it is to be understood that modifications may be readily made to adapt the fountain to other forms of faucets or other types of aerators.

For normal operation of the faucet, that is, directing a stream of water A in a generally downward direction, the valve 14 will be positioned substantially as shown in FIG. 4. The weight of the disc 17 is sufficient to counterbalance the handle 23 and the disc will be generally vertically disposed out of the water stream.

To provide a stream of water for drinking, the valve 14 is manually pivoted to a closed position, as shown in FIG. 5, by pushing the handle 23 downwardly. Only a portion of the water flowing from the aerator will flow through the aperture 25 and the built-up pressure will cause a stream of water B to be directed upwardly through the spout 13. Release of the handle 23 permits the valve 14 to pivot by gravity to the normal dependent position of FIG. 4 with the disc 17 supported out of the normally downwardly flowing stream of water A.

The fountain unit of this invention may be readily attached to a water faucet without any expensive installation tools or personnel. It is inexpensive to manufacture requiring few separately fabricated parts and eliminates the necessity of providing such parts as springs or an accurately machined valve member and its associated seat.

The fountain is capable of providing an upwardly directed stream of water for drinking purposes whenever desired. Although the fountain remains attached to the faucet, it does not interfere with the normal operation. It is simple to use only requiring that the valve be manually pivoted to close the lower end of the body and the usual faucet valve be manipulated to permit a stream of water to flow into the fountain.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A water fountain unit attachable to a water faucet having a terminal end comprising an elongated tubular body having first and second open ends and adapted to axially receive the terminal end of the faucet through said first end, means carried by said body for cooperatively engaging the faucet and maintaining the unit in operative relationship therewith, sealing means attached to said body at said first end and being engageable with the faucet forming a water impervious seal therewith, an elongated, open ended tubular spout attached to said body and communicating interiority thereof, said spout extending outwardly and upwardly from said body, and a manually-operated valve member pivotally mounted exteriorly on said body for substantially closing said second end and causing a flow of water through said spout including a plate adapted to sealingly engage said second end, said plate being pivotally supported on the external wall of said body for swinging in a vertical plane with the center of gravity thereof eccentric to said pivot support whereby gravity will normally maintain said plate out of engagement with said second end.

2. A water fountain unit attachable to a water faucet having a terminal end provided with an aerator formed with air inlet apertures comprising an elongated tubular body having first and second open ends adapted to axially receive the aerator interiorly thereof through said first end with the interior of said body being substantially larger than the aerator and permitting the passage of air between adjacent wall surfaces and with the aerator air inlet apertures positioned within said body, means carried by said body for cooperatively engaging the aerator and maintaining the unit in operative relationship to the aerator, sealing means attached to said first end and being engageable with the aerator and forming a water-impervious seal therebetween, an elongated, open-ended tubular spout attached to said body and communicating interiorly thereof, said spout extending outwardly and upwardly from said body, and a manually-operated valve member pivotally mounted exteriorly on said body for substantially closing said second end and causing a flow of water through said spout including a plate adapted to sealingly engage said second end, said plate being pivotally supported on the external wall of said body for swinging in a vertical plane with the center of gravity thereof eccentric to said pivot support whereby gravity will normally maintain said plate out of engagement with said second end.

References Cited in the file of this patent

UNITED STATES PATENTS

| | | |
|---|---|---|
| 2,044,117 | Heckert | June 16, 1936 |
| 2,320,530 | Mead | June 1, 1943 |
| 2,392,512 | Thompson | Jan. 8, 1946 |
| 2,524,956 | Brunetti | Oct. 10, 1950 |
| 2,579,769 | Taylor | Dec. 25, 1951 |